July 4, 1967 P. ROUGE ETAL 3,329,576
CORE STRUCTURE FOR SOLID-MODERATOR NUCLEAR REACTORS
Filed March 2, 1966 4 Sheets-Sheet 1

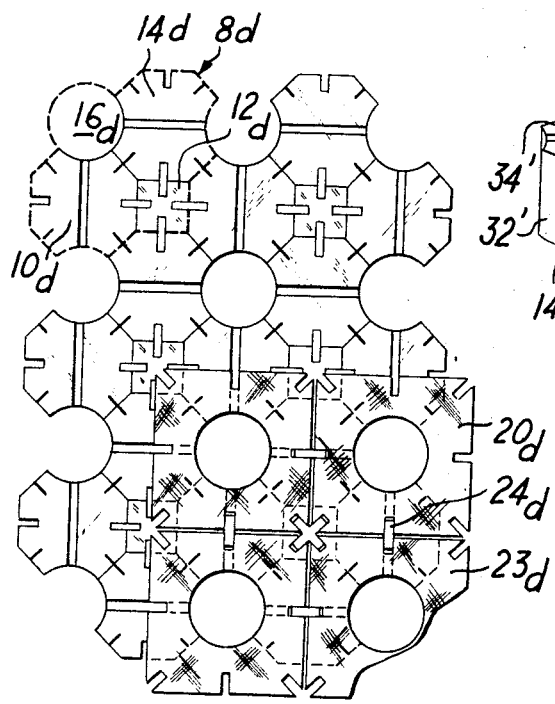
FIG. 4
FIG. 10
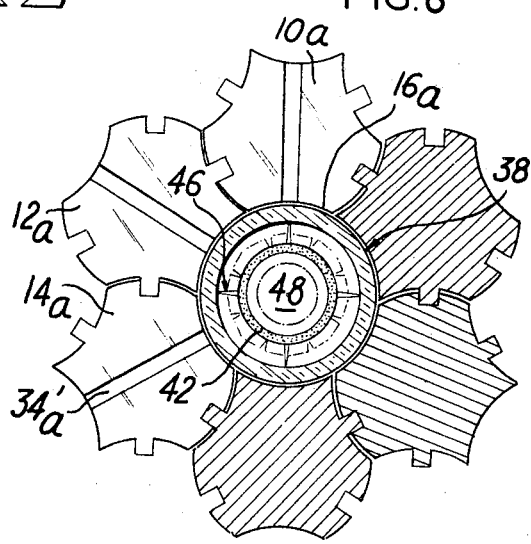
FIG. 6

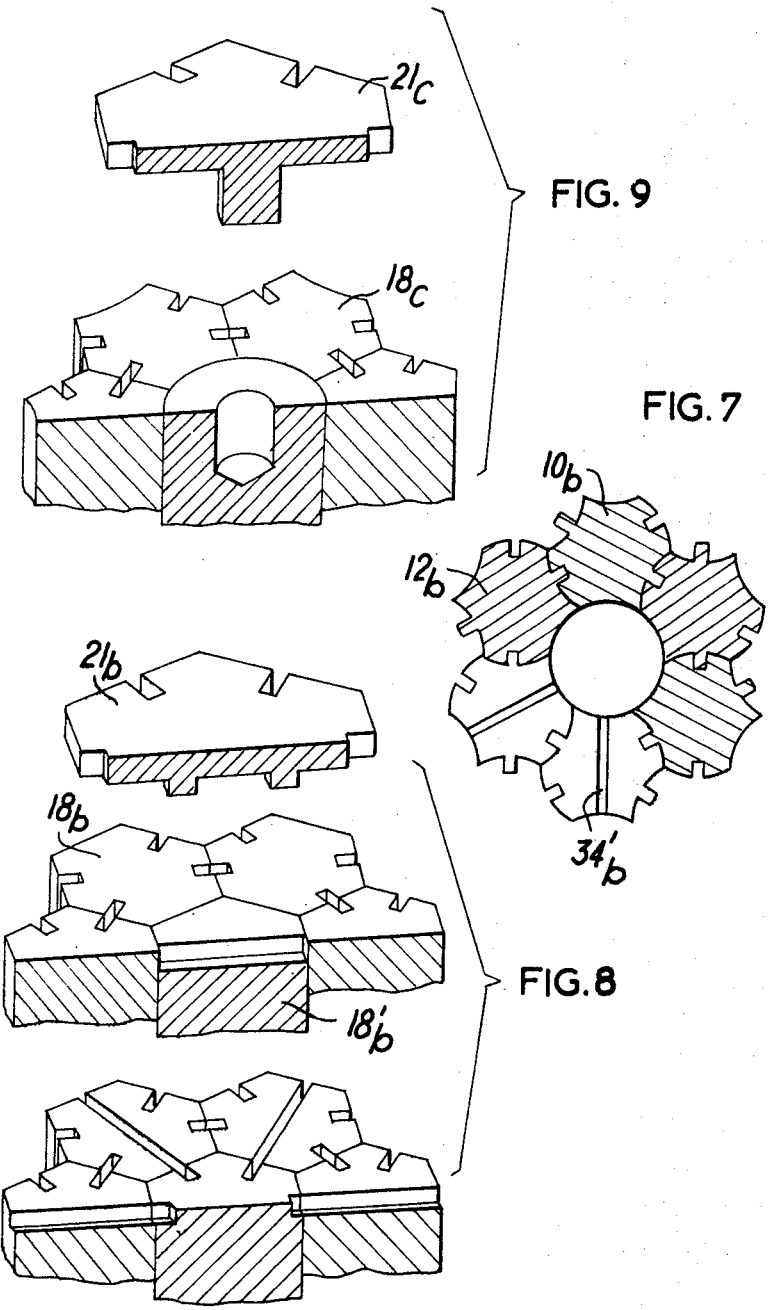

United States Patent Office 3,329,576
Patented July 4, 1967

3,329,576
CORE STRUCTURE FOR SOLID-MODERATOR
NUCLEAR REACTORS
Pierre Rouge, Orsay, and Jean Vivien, Versailles, France, assignors to Commissariat a l'Energie Atomique, Paris, France
Filed Mar. 2, 1966, Ser. No. 531,193
Claims priority, application France, Mar. 12, 1965, 8,930
8 Claims. (Cl. 176—84)

This invention relates to a core structure for nuclear reactors of the solid moderator type.

In reactors of this class, the core usually consists of a mass of moderator material consisting of an assembly of blocks or so-called bricks in which are formed channels designed to accommodate fuel elements and through which the coolant is circulated. In most core structures, the bricks are assembled together so as to form vertical columns in adjacent relation, each column being thus formed of a series of bricks which may or may not be identical but which usually have the same cross-sectional configuration and are placed end to end. The cohesion and stability of the complete structure can be ensured by a number of different means; one advantageous solution which is now almost exclusively adopted was described in French Patent No. 1,214,246 filed by Commissariat a l'Energie Atomique.

In the structures which have been employed up to the present time, the bricks constituting each column were bored along their longitudinal axes and each core channel was thus formed by superimposing the bores in a column. This arrangement is nevertheless subject to a certain number of drawbacks, taking into account the current tendency to increase the pitch of the channels as well as their dimensions. The difficulty involved in the extrusion of graphite bricks of large section imposes a limitation on the column lattice pitch and therefore on the channel pitch if all of the bricks are bored since, in this case, both pitches are identical. Moreover, it would not be practicable to form channels only in a certain number of moderator columns since the channel cross-section would have to be such that it would weaken the column in which it is formed to an excessive degree.

One solution whereby the lattice pitch of the core channels can be given a higher value than the lattice pitch of the columns (and therefore a higher value than the transverse dimensions of the bricks has been described and claimed in French Patent No. 1,331,952 as filed on Mar. 27, 1962 in the name of the present applicant.

The core structure as described and claimed in the patent cited comprises a plurality of identical prismatic assemblies which extend parallel to a common direction and the cross-sectional relation of which at right angles to said direction is such that said assemblies are continuous but for a working clearance, longitudinal keying means parallel to said direction and extending between said assemblies in at least two different orientations, characterized in that each of said assemblies comprises at least two prismatic moderator bricks mounted in end-to-end relation and having axes parllel to sid common to-end relation and having axes parallel to said common direction, a nuclear fuel structure defining a path for the flow of cooling fluid which is parallel to said direction, keying means extending parallel to said direction, each fuel structure being adapted to fit within the prismatic assembly which is provided therefor and the prismatic assemblies being so inter-related that each fuel structure is surrounded solely by moderator bricks.

Among structural designs of the type hereinabove described which are of greatest interest, there can be mentioned those in which each assembly has a small number of columns, namely three or four, in respect of a single fuel structure. If such a number is exceeded, the channel pitch becomes too great, unless columns having complicated or different cross-sections are employed in each assembly of columns. If, on the contrary, the number of columns falls to two, it is in that case difficult to ensure stability of the structure as a whole.

However, core structures which are built up of assemblies having three or even four columns do have certain disadvantages. In particular, the presence of machining clearances, the removal of certain keying planes on account of the replacement of columns by fuel structures give rise to uncontrolled variations of pitch.

The present invention is directed to the design concept of a core structure of the type mentioned above which meets practical requirements more effectively than arrangements of the prior art, especially insofar as the undesirable phenomena referred to above are attenuated or even eliminated.

To this end, the invention proposes a nuclear reactor core structure of the type comprising vertical columns each built up of superposed solid bricks of moderator material having the same section, keying means for interlocking said bricks, channels located between the columns in parallel relation thereto for accommodating fuel elements and located at the apices of a uniform lattice having a pitch greater than the largest dimension of the transverse cross-section of any one of the columns, said core structure being carried on a support structure and surmounted by a thermal shield, especially characterized in that the thermal shield is divided into adjacent elements with clearances therebetween and disposed on a lattice which is identical with the channel lattice, in that each of said shield elements is coupled with the adjacent elements by keying means extending along at least three planes passing through the axis of the shield element, and in that coupling means are provided between said shield elements and the columns so as to maintain the identity of the channel lattice with the shield element lattice.

As will be apparent, the shield elements are each pierced by a hole having dimensions which correspond to those of the channel; inasmuch as said shield elements are fabricated of a material which can be obtained in parts of large size (steel, for example), the fact that the dimensions of said shield elements are greater than those of the transverse cross-section of the columns is not objectionable.

The invention is primarily applicable, although not exclusively so, to core structures of the type hereinabove defined which consist in juxtaposing assemblies each comprising three columns in respect of one channel containing fuel elements. Among the arrangements thus defined, one of the most advantageous appears to be that in which the columns are all identical and made up of bricks having a cross-section in the shape of a regular hexagon. In fact, in this case, the three keying planes which are necessary in order to provide a hyperstatic junction between the columns subtend an angle at the center of 120° or, in other words, are in perfectly symmetrical relation.

An alternative form of this arrangement consists in endowing the channels with a cylindrical shape instead of a hexagonal shape by cutting out one column face out of three so as to result in a transverse cross-section of semi-circular configuration. However, the term "hexagonal" will be employed hereinafter to extend to this case also.

The invention further consists of other arrangements which are preferably employed in conjunction with the preceding but which can also be employed independently thereof. All of these arrangements will become more readily apparent from a perusal of the following description of modes of practical application of the invention which are given by way of example and not in any limiting sense. The description refers to the accompanying drawings, in which:

FIG. 1 is a diagrammatic view in perspective showing the upper portion of a nuclear reactor core, the fuel elements having been removed and the thermal shield having been lifted;

FIG. 2, which is similar to FIG. 1, illustrates the keying system whereby the thermal shield is interlocked with the moderator columns;

FIG. 4 is a diagrammatic view in perspective showing a portion of the structure and the keying system which serves to limit the relative rotational movement of the bricks of a same column;

FIGS. 6 and 7 are plan views showing other possible modes of application of the invention;

FIGS. 8 and 9 are diagrammatic detail views in perspective and in partial cross-section illustrating alternative forms of embodiment of the reflector;

FIG. 10, which is similar to FIGS. 6 and 7, shows a further alternative form of application of the invention.

Figure 1:
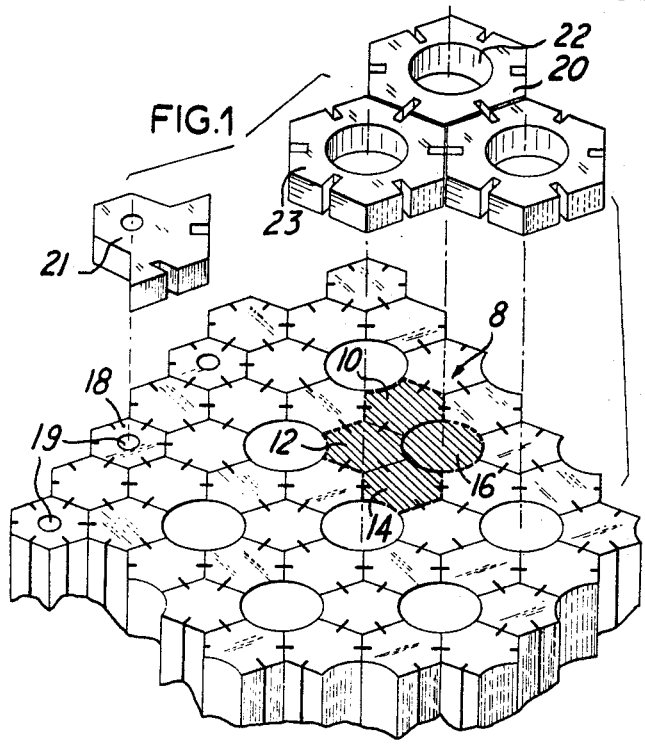

The lower portion of FIG. 1 shows very diagrammatically a section of the reactor core; the central portion thereof which constitutes the active portion of the core consists in a juxtaposition of identical unitary assemblies. Each of said assemblies such as the assembly 8 which is framed in broken lines is composed of three columns 10, 12 and 14 having hexagonal cross-sections and vertical axes, said columns being interlocked by vertical lines of keys, and a channel 16. The channel 16 is intended to accommodate a nuclear fuel structure (not shown in the drawings) consisting of a fuel stringer and provides a passage for the circulation of cooling fluid within the reactor. It can be seen that the juxtaposition of the assemblies such as 8 as considered in transverse cross-section would make it possible to fill the plan without spaces other than the clearances (not shown) which are allowed between assemblies and between columns of a same assembly. It can be seen that one face out of three of each column has a semi-cylindrical shape which endows the channel with a circular transverse cross-ection, thereby facilitating the manufacture of fuel elements which are intended to be inserted therein.

In the form of embodiment which is shown in FIG. 1, wherein each assembly comprises three columns per channel, two faces out of three are keyed whilst the third face constitutes a portion of the channel wall and has a semi-cylindrical shape. Each column is thus interlocked with the adjacent columns forming part of the same assembly or of an adjacent assembly by four lines of longitudinal keys located in planes passing through the axes of the two columns to be coupled. Said four keying lines are therefore located in two planes at 60° with respect to each other.

The active portion of the core (which is formed by assemblies such as the assembly 8) is surrounded by a reflector which is made up of full columns such as the column 18. These columns have a cross-section in the shape of a regular hexagon, with the result that all of their faces are plane, each column being coupled to the adjacent columns by six lines of keys located in three planes at 60° relatively to each other.

The reflector can in turn be maintained by a rigid side restraint or a series of beams (not shown) disposed within ducts 19 in accordance with a conventional arrangement.

The structure which is shown in the lower portion of FIG. 1 is essentially distinguished from the core structure which is described in French Patent No. 1,214,246 cited earlier in that use is made of solid bricks and in that one brick out of four is omitted so that each channel is limited by six surrounding bricks. The pitch of the channel lattice is thus equal to twice that of the brick lattice whereas, in the case of the stack described in the French patent, referred-to hereinafter as a "complete stack," the two pitches are equal.

If the stack is employed without any components other than those which have already been mentioned, said stack being carried on a conventional support structure and provided with a top thermal shield of the usual type, the stack which is shown in the lower portion of FIG. 1 is in that case subject to a certain number of disadvantages. When the structure is inoperative, that is to say before it is subjected to thermal cycling or irradiation, the bricks show a tendency to group together in clusters of a few columns (as a rule between three and five columns). Consequently, the clearances between columns are unequal and the channel pitch is no longer strictly uniform. When the structure is subsequently subjected to a thermal cycling which results in "breathing" of the stack and in thermal deformations both of the peripheral side restraint and of the core support structure, the clearances vary in an uncontrolled manner. The channel lattice consequently becomes even more irregular and the channel pitch no longer has the uniform value which it would have in the theoretical structure, except for possible variations in clearances.

The core structure which is shown in the lower portion of FIG. 1 has only two keying planes for each brick. Consequently, the forces which are developed by a radial stress exerted by a side restraint close to a keying plane and which are transmitted into the structure accordingly produce a rotational movement of the columns, which is a further cause of deformation of channels and channel lattice.

These three effects combined result in lack of precision in the shape of channels, in their dimensions and in their position in the stack; in certain cases, such deformations can exceed the tolerances which are allowed for the positioning of the fuel elements.

The purpose of this invention is to provide in another form in this structure an additional keying plane which is located at an angle of 60° with respect to the two first keying planes, so that the corresponding keys transmit stresses only during the "breathing" of the stack but continuously check any tendency toward rotation and ensure uniformity of movement, thus preventing the bricks from grouping together.

Figure 2:
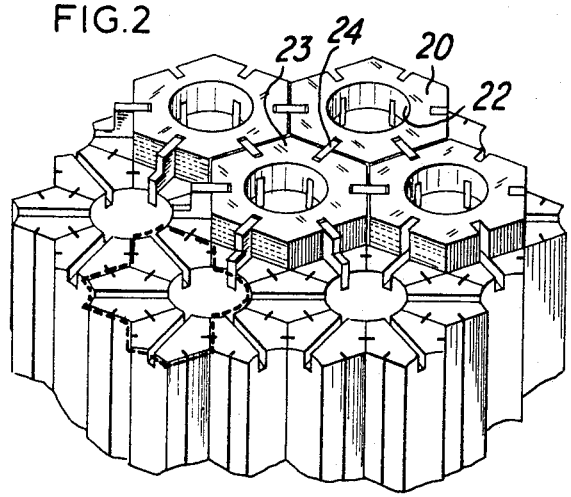
Figure 3:
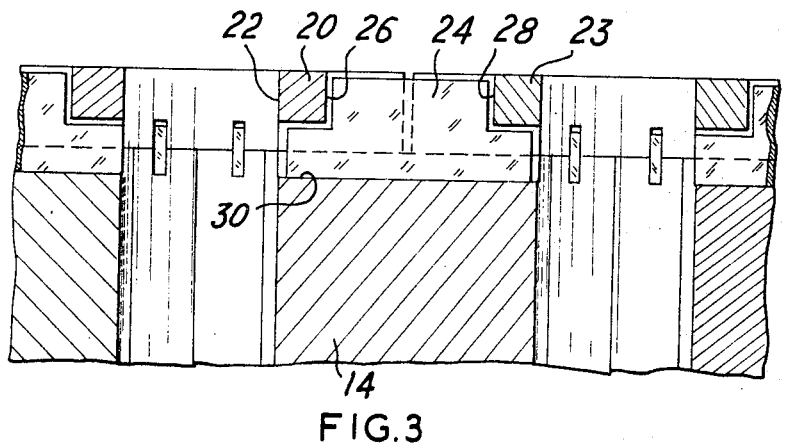
FIG. 3 is a detail view on a large scale and in cross-section along one of the keying planes between the thermal shield and the moderator columns.

The solution which is illustrated by way of example in FIGS. 1, 2 and 3 consists in making use of the top thermal shield, which is usually constructed of steel, for the purpose of providing an additional keying plane. Said shield, which rests on the core structure, is divided into a series of tiles such as 20 which are assembled together in such a manner as to form a "complete" stack having a pitch equal to that of the channel lattice pitch and the same apices, each tile being coupled with the columns of the active portion of the core. In view of the fact that the thermal shield is formed of a material which readily lends itself to the fabrication of parts having dimensions either equal to or larger than the channel lattice pitch, the disadvantage attached to a great pitch no longer arises.

The tiles such as 20 have a cross-section in the shape of a regular hexagon. With the exception of the tiles which cover the reflector, said tiles are each pierced by a central bore 22 which forms an extension of each channel 16. Each tile 20 is coupled with the six adjacent tiles such as the tile 23 and with the six columns over which it is placed (column 14, for example) by means of six graphite keys such as the key 24 (as shown in FIGS. 2 and 3). The key engages in two radial grooves 26 and 28 of two adjacent tiles 20 and 23 (by the term "radial groove" is meant a groove of which the central plane passes through the axis of the corresponding tile). The key 24 also penetrates into a groove 30 formed in the top face of the uppermost brick of column 14. Said key 24 occupies the plane corresponding to that of the keying line which is absent from the column and therefore restores this latter at the level of the uppermost layer of bricks. It can therefore be seen that the thermal shield imposes a correct positioning on the top channel extremities by eliminating rotation and grouping of bricks, subject to possible play. The shield elements or tiles can bear on the columns either directly or by means of keys 24; this last-mentioned solution reduces the friction which arises in the event of differential expansion of tiles and bricks.

The columns of bricks can rest directly on the support structure without any connection with this latter other than direct contact. This solution is conventional and permits of slight displacement of the columns on the support structure, especially in the case of the thermal expansion or shrinkage. The columns can also be separated from the support structure by an intermediate support plate or diagrid having a structure which is similar to that of the thermal shield.

In the intermediate zones of the core structure, the deformations and rotational movements are evidently limited to a substantial extent by the keying of the uppermost layer (and possibly also the lowermost layer) to the thermal shield (and if necessary also to the diagrid). In order to reduce rotational movements still further, any relative movement of rotation between two superposed bricks of a same column can also advantageously be prevented. If each brick of any given column is thus rotationally coupled with the uppermost brick and with the lowermost brick of the column and if any rotational displacement of these latter is prevented, the column as a whole will be secured against rotation, subject to possible play.

Figure 5:
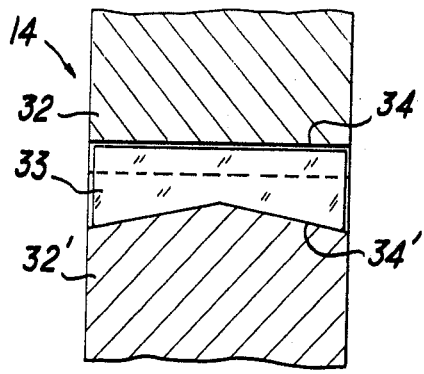
FIG. 5 is a cross-section taken along the same plane as FIG. 3 showing the keying system of FIG. 4.

The locking against rotation of two superposed bricks such as the bricks 32 and 32' (FIGS. 4 and 5) of a same column can be carried out by means of a key 33 placed in a radial plane which passes at an angle of 60° with respect to the two keying planes which already exist. The key 33 engages both in a groove 34 which is formed in the underface of the brick 32 and in a groove 34' which is formed in the top face of the brick 32'. In order to prevent sliding of the key 33, the bottom face thereof can advantageously be provided with a V-shaped cut-out portion so as to engage in the bottom of the groove 34' which has a corresponding shape, as shown in FIG. 5.

At the time of thermal cycling and irradiation of the core structure which is illustrated, the processes which occur are similar to those described in the French patent which has been cited earlier; as and when any temperature variation takes place and gives rise to expansion or shrinkage of the peripheral side restraint and possibly also of the bricks, expansion or shrinkage of the reflector propagates from point to point within the structure (thermal shield tiles and columns), that is to say if the movements of expansion of the bricks does not offset the displacement of their axes. The tiles such as 20 and 23 of the top thermal shield are capable of displacement but their axes remain located at the apex of a uniform lattice which is homothetic with the primitive lattice as a result of the keys. The tiles in turn maintain the channels centered at the channel lattice nodes and stabilize their dimensions by virtue of the junction between the tiles and the top faces of the columns. The entire structure expands or shrinks while remaining substantially homothetic with itself in plan.

In the case of modification (expansion or shrinkage) of the radial dimensions of the bricks under irradiation as a result of the Wigner effect, the peripheral side restraint and tiles remain stationary and maintain the assembly of columns; only the clearances between columns are modified and are liable to become unequal, but the column lattice and channel lattice remain unchanged. In the arrangement which has just been described in which the reflector is built up of columns which are identical with those of a "complete" stack, it is necessary to machine three different types of bricks: the bricks of the active portion have two semicylindrical faces, the reflector bricks have all of their faces plane, the intermediate bricks have a single semicylindrical face. The tile elements such as 21 which surmount the reflector (as shown in FIG. 1) and which provide a linkage with the restraint beams have a special shape.

FIG. 6 shows diagrammatically an alternative form of the embodiment of FIGS. 1 to 5; for the sake of greater clarity, the corresponding parts of FIGS. 1 to 4 on the one hand and of FIG. 6 on the other hand bear the same reference numerals to which is assigned the index $a$ in FIG. 6.

The active portion of the core is again made up of prismatic bricks of identical transverse cross-section. The lateral keying faces of said bricks are provided successively with a rib then a groove which provides a coupling with the bricks of adjacent columns by engagement of said ribs in the corresponding grooves; ribs and grooves are so designed that, in each brick, the distance between the longitudinal axis of the brick and the bottom of each groove is substantially equal to the distance between the axis and the base of each rib. Thus, the lateral faces of the prismatic bricks can have a general shape which is respectively either concave or convex depending on whether they are provided with a rib or a groove. An economy both in machining and in moderator material is thus achieved as well as greater strength of each brick.

Inasmuch as the keys form part of the bricks in this form of embodiment, the bricks can be disposed in horizontal layers which take up the entire crosssectional area only by virtue of the presence of keys 33 between layers. This solution is therefore the most advantageous. However, provision can be made for a longitudinal displacement of the bricks in adjacent columns so as to permit the engagement of at least a certain number of keys in the grooves of two successive bricks of an adjacent column; the disadvantage of this solution lies in the fact that it calls for the use of special bricks in the uppermost and lowermost layers.

A fuel element 38 has been illustrated by way of example in the channel 16a; said fuel element consists of a graphite sleeve 40 and a tubular fuel cartridge 42 which is maintained centered within the sleeve by means of splitters 46. The coolant gas circulates within the central duct 48 of the fuel cartridge and between the outer face of the fuel cartridge 42 and the bore of the sleeve 40. The inner and outer cans of the fuel cartridge are usually provided with fins, only the outline of which has been shown diagrammatically in chain-dotted lines in FIG. 6.

The alternative form of FIG. 7 differs from the embodiment of FIG. 6 only in the location of the keys which form part of the bricks, wherein two opposite faces of said bricks are provided with a key whilst two other opposite faces are provided with grooves.

The reflector structure which is shown in FIG. 1 can be replaced by alternative forms and in particular by those shown in FIGS. 8 and 9. The portion of reflector which is shown in FIG. 8 is made up of bricks such as the brick 18b, all the faces of which are plane but which are provided with only four grooves. The mode of assembly of said structure is therefore the same as in the case of the active portion and the spatial intervals between said bricks are taken up by other bricks of hexagonal section such as the brick 18'b which are not keyed. Said bricks 18'b are held in position either by the keys which serve to couple the tile elements such as 21b with the adjacent columns or (as shown in FIG. 8) by means of two lugs which are formed in one piece with the tile elements 21b and which are adapted to penetrate into two axial grooves formed in the head of the brick 18'b. Centering pins (not shown) are placed between two successive bricks of a same column (lower portion of the figure).

In the form of embodiment of FIG. 9, the reflector is built up of bricks such as the brick 18c which are identical with the core bricks and the channels are occupied by cylindrical bricks, each brick being held in place by means of a central lug which forms one piece with the corresponding tile element 21c.

FIG. 10 shows another alternative form of application of the invention. The corresponding parts of FIGS. 1, 2 and 3 on the one hand and of FIG. 10 on the other hand bear the same reference numeral followed by the index d in FIG. 10. In this figure, the clearances between columns have not been shown for the sake of enhanced clarity.

Each assembly of the form of embodiment of FIG. 10 such as the assembly 8d is composed of three columns and a cylindrical channel 16d. One of the columns 12d is of square cross-section whilst the two other columns 10d and 14d are of octagon cross-section, two out of the eight faces which delimit a channel being semi-cylindrical.

The thermal shield can be divided up in a number of different ways. In the form of embodiment which is presented here, the thermal shield is divided into square tiles such as the tile 20d, each tile being centered on a channel and coupled to the adjacent tiles by means of eight keys disposed in four planes at an angle of 45° relatively to each other.

As will be understood, the invention is not limited to the arrangements which have been described in the foregoing and illustrated in the accompanying drawings solely by way of example.

What we claim is:

1. Core structure for nuclear reactors of the solid moderator type wherein at least the central portion of said structure comprises vertical columns each built up of superposed solid bricks of moderator material having the same crsos-section, keying means for interlocking said columns, channels formed parallel to and defined by said columns for fuel elements and located at the apices of a uniform lattice having a pitch greater than the largest dimension of the transverse cross-section of any one of the columns, a support structure for said core structure, a thermal shield on top of said core structure, said thermal shield being divided into adjacent elements with clearances therebetween and disposed on a lattice which is identical with the channel lattice, each of said shield elements being coupled to adjacent elements by keying means extending in at least three planes passing through the axis of the shield element and coupling means between said shield elements and the columns maintaining the identity of the channel lattice with the shield element lattice.

2. Core structure as described in claim 1, said coupling means consisting of keys each disposed in a plane which joins the axes of two adjacent shield elements and coupling said two shield elements with the same column.

3. Core structure as described in claim 2, said keys engaging with slight friction in two axial grooves in two adjacent shield elements and located in the plane which joins the axes of said two elements and in a groove in the uppermost end face of the column supporting the two shield elements.

4. Core structure as described in claim 1, each column being coupled by keying means for preventing rotational movement of the bricks relative to each other about the axis of the column.

5. Core structure as described in claim 4, said last named keying means being located between opposite faces of the bricks in a plane passing through the axis of said column and angularly spaced from the planes of the keying means between said column and adjacent columns.

6. Core structure as described in claim 1, said central portion comprising assemblies of three columns of hexagonal cross-section and a channel, each column being coupled with adjacent columns by longitudinal keying means located in two planes spaced from each other by 60° passing through the axis of the column, said shield elements being regular hexagons in cross-section and coupled by keying means located in three planes spaced from each other by 60°.

7. Core structure as described in claim 6, the columns having four rectilinear sides and two opposite semi-circular sides, the apices of said hexagon being disposed at an angle of 60° with respect to each other about a circumference.

8. Core structure as described in claim 1, said core support structure being of the same material as said thermal shield.

References Cited

UNITED STATES PATENTS

| 3,157,582 | 11/1964 | Babule et al. | 176—84 |
| 3,206,373 | 9/1965 | Dupuy | 176—84 |

FOREIGN PATENTS

| 1,331,952 | 6/1963 | France. |
| 965,209 | 7/1964 | Great Britain. |
| 639,531 | 5/1962 | Italy. |

CARL D. QUARFORTH, *Primary Examiner.*

M. J. SCOLNICK, *Assistant Examiner.*